United States Patent
Ries

Patent Number: 5,798,048
Date of Patent: Aug. 25, 1998

[54] MULTILAYER PLASTIC FUEL FILTER HAVING ANTISTATIC PROPERTIES

[75] Inventor: Hans Ries, Marl, Germany

[73] Assignee: Huels Aktiengesellschaft, Marl, Germany

[21] Appl. No.: 654,240

[22] Filed: May 28, 1996

[30] Foreign Application Priority Data

May 27, 1995 [DE] Germany ............ 195 19 481.0

[51] Int. Cl.$^6$ ........................................ B01D 35/30
[52] U.S. Cl. ................... 210/767; 210/243; 210/435; 361/215; 264/250
[58] Field of Search .............. 210/243, 435, 210/767; 361/215; 428/297.1, 297.4, 300.1, 300.7, 301.4; 264/250

[56] References Cited

U.S. PATENT DOCUMENTS

| | | |
|---|---|---|
| 3,070,132 | 12/1962 | Sheridan ........................ 361/215 |
| 3,907,955 | 9/1975 | Viennot .......................... 361/215 |
| 4,906,494 | 3/1990 | Babinec . |
| 5,213,882 | 5/1993 | Sassa et al. . |
| 5,258,213 | 11/1993 | Muegge et al. . |
| 5,313,987 | 5/1994 | Roeber et al. . |
| 5,362,529 | 11/1994 | Muegge et al. . |
| 5,362,570 | 11/1994 | Roeber et al. . |
| 5,380,432 | 1/1995 | Brandt . |
| 5,389,410 | 2/1995 | Muegge et al. . |
| 5,404,915 | 4/1995 | Muegge et al. . |
| 5,425,817 | 6/1995 | Muegge et al. . |
| 5,449,024 | 9/1995 | Roeber et al. . |
| 5,472,784 | 12/1995 | Roeber et al. . |
| 5,474,822 | 12/1995 | Roeber et al. . |
| 5,478,620 | 12/1995 | Muegge et al. . |
| 5,500,263 | 3/1996 | Roeber et al. . |
| 5,510,160 | 4/1996 | Jadamus et al. . |
| 5,512,342 | 4/1996 | Roeber et al. . |

FOREIGN PATENT DOCUMENTS

| | | |
|---|---|---|
| 0 470 606 | 2/1992 | European Pat. Off. . |
| 44 10 148 | 9/1995 | Germany . |
| 2 279 890 | 1/1995 | United Kingdom . |

*Primary Examiner*—Matthew O. Savage
*Attorney, Agent, or Firm*—Oblon, Spivak, McClelland, Maier & Neustadt, P.C.

[57] ABSTRACT

A plastic fuel filter having at least three layers, wherein the inner and outer layers are made of a plastic which has been made conductive (component A) and have embedded between them one or more layers of one or more plastics which have not been made conductive (component B, etc.), with the inner and outer layers together forming a continuous conductive path. The fuel filter is made from inexpensive materials and is simple to produce. The fuel filter of the present invention can be used in the motor vehicle sector.

18 Claims, 1 Drawing Sheet

MULTILAYER PLASTIC FUEL FILTER HAVING ANTISTATIC PROPERTIES

BACKGROUND OF THE INVENTION

1. Field of the Invention

The invention relates to a plastic fuel filter having a continuous conductive path from the inside to the outside, the filter thus possessing antistatic properties.

2. Discussion of the Background

In fuel line systems for vehicles having an internal combustion engine, high electrostatic charging occurs as a result of the flowing fuel. Under certain weather conditions, the electrostatic charge can discharge suddenly, producing holes in the wall of the filter housing through which the fuel can flow out. The fuel can ignite on contact with hot parts in the engine compartment or the exhaust system, and lead to a vehicle fire.

To avoid this problem it is necessary to make both the plastic fuel line and the plastic of the filter housing conductive, and to provide a conductive connection between the vehicle chassis and the filter. This brings filter and chassis to the same potential and thus prevents a charge build-up.

Plastic fuel filters which have been made conductive are described in U.S. Pat. Nos. 5,164,084 and 5,164,879. In these references, the entire wall of the filter housing is made of a molding composition which has been made conductive. Disadvantages of such materials are that they are very expensive in comparison with nonconductive molding compositions based on the same polymer, and in addition, they can have inferior mechanical properties. Furthermore, making molding compositions conductive lowers their resistance to oxidized fuels (sour gas).

To solve these problems, it was proposed in U.S. Pat. No. 5,382,359 that a filter housing of nonconductive plastic be provided with a metallic coating layer. However, the conductive path necessary for conducting the charges arising in the interior of the filter to the outer wall can only be produced in this system if a continuous layer is provided via the connection nipples, from the inside to the outside. This is particularly difficult using electrolytic processes. In addition, electrolytic processes are very time-consuming and cost-intensive and require the use of relatively environmentally unfriendly chemicals.

Applying the conductive layer by a dipping process is likewise problematic. Since the filters are made of two halves which have been welded together, the surface to be welded must be free of the conductive coating. This makes necessary a complicated covering of the surfaces and at the same time interrupts the conductive path between the interior of the filter and the external skin at the point of welding. Alternatively, coating the two halves together after welding fails to coat the interior of the filter.

Another disadvantage of U.S. Pat. Nos. 5,164,084 and 5,164,879 is that the polyamide 12 (PA 12) used for the wall material has a relatively high permeation rate for various fuel components, particularly methanol- or ethanol-containing fuels. This can result in significant losses of fuel components, especially at high temperatures. Various thermoplastic materials such as fluoropolymers, polyesters or ethylene-vinyl alcohol copolymers (EVOH) act as good barriers towards fuels. However, their impact toughness, particularly at low temperatures, is unsatisfactory and is nowhere near that of the polyamides, making them unsuitable for use in the plastic fuel filters as described in U.S. Pat. Nos. 5,164,084 and 5,164,879.

SUMMARY OF THE INVENTION

An objective of the present invention is to provide a plastic fuel filter which has been made conductive.

Another objective of the present invention is to provide a plastic fuel filter which is based on inexpensive materials, and is simple to produce.

Still another objective of the present invention is to provide a plastic fuel filter which does not allow the diffusion of fuel components through the filter housing, particularly in the case of fuels having a relatively high alcohol content.

These objectives are achieved by a multilayer plastic fuel filter the housing thereof having at least three layer:

(a) a conductive inner layer and a conductive outer layer, both containing a first plastic;

(b) a non-conductive middle layer, between the inner layer and the outer layer, containing a second plastic;

wherein the inner and outer layers together form a continuous conductive path.

The objectives are also achieved by a method of filtering a fuel through a fuel filter, where the housing of the fuel filter contains:

(a) a conductive inner layer and conductive outer layer, both containing a first plastic;

(b) a non-conductive middle layer, between the inner layer and the outer layer, containing a second plastic;

wherein the inner and outer layers together form a continuous conductive path.

The housing of such a filter can be produced by means of multicomponent injection molding or by the monosandwich process.

DETAIL DESCRIPTION OF THE INVENTION

Figure 1:
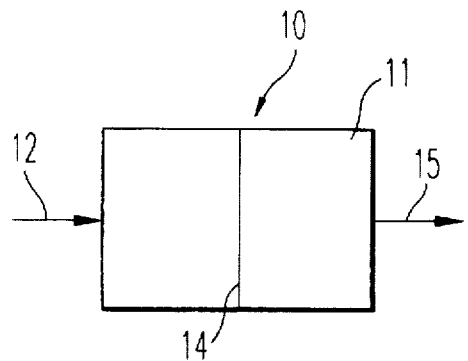
FIG. 1 shows a multilayer plastic fuel filter according to the invention.

FIG. 1 shows a fuel filter 10 according to the invention including a filtering means 14 for filtering fuel, a fuel inlet means 12, a fuel outlet means 15, and a housing 11 surrounding the filtering means and including the inlet means and the outlet means.

Figure 2:
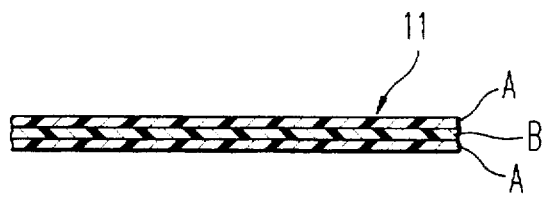
FIGS. 2–5 show multi-layer composites used to form the housing of the multilayer plastic fuel filter shown in FIG. 1.
Figure 3:
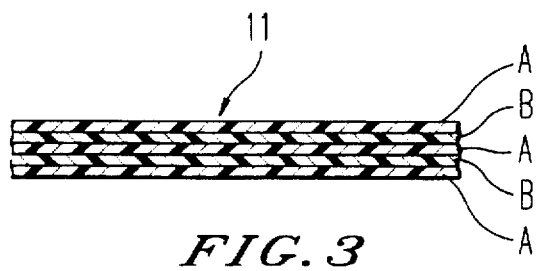
Figure 4:
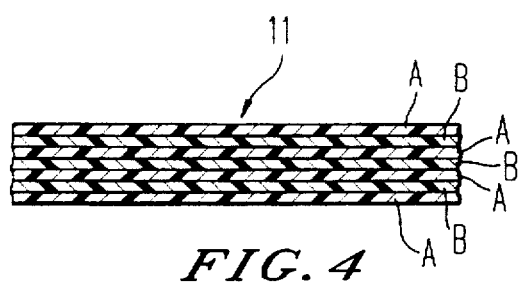
Figure 5:
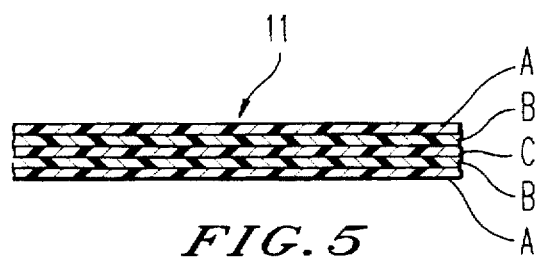

Plastic articles have been produced by multicomponent injection molding (see, for example, Th. Zipp, FlieBgverhalten beim 2-Komponenten-SpritzgieBgen, thesis, RWTH Aachen, 1992). When using two components A and B, the conductive component A is molded first and the nonconductive component B is subsequently injected. Such a procedure results, looking through a section of the filter housing, in the layers being ordered A/B/A (see FIG. 2). However, the conductive layer A is closed at the beginning and end of the flow path, since only the core region is filled by the component B. This ensures the continuous transfer of the charges from the inside to the outside. Furthermore, it is possible to carry out a multiple change of the components A and B by appropriate sequencing of the injection procedure in the 2-component injection-molding process, so as to produce, for example, a structure A/B/A/B/A (see FIG. 3) or A/B/A/B/A/B/A (see FIG. 4). In addition, use of three injection machines makes it possible to produce five-layer composites of the type A/B/C/B/A (see FIG. 5), for example, the composite of a conductive component A with a noncompatible core material C via a coupling agent B.

The monosandwich process has been used before; on this subject see, for example, C. Jaroschke, Neue Wege beim Sandwich-Spritzgießen, Kunststoffe 83 (1993) 7, pp. 519–521.

Component B can contain the same base polymer as component A. However, component B (and, if applicable, component C, etc.) can also contain a different base polymer than component A. Preferably, the polymer combinations of molding compositions are compatible with one another, or have been modified using compatibilizers. Two directions can be pursued:

a) A less expensive polymer base can be used. In this case, component B contains a lower-cost molding composition than component A.

b) The barrier action towards the fuel or individual fuel components can be increased. The same material combinations can be used as in the corresponding multilayer pipes as disclosed in the following documents:

DE-A or -C 40 01 125,
40 06 870,
41 12 662,
41 12 668,
41 37 430,
41 37 431,
41 37 434,
42 07 125,
42 14 383,
42 15 608,
42 15 609,
42 40 658,
43 02 628,
43 10 884,
43 26 130,
43 36 289,
43 36 290,
43 36 291, the German Patent Applications P 44 10 148.1 and 195 07 025.9 which are not prior publications and WO-A-93/21466, WO-A-94/18 485, EP-A-0 198 728 and EP-A-0 558 373.

Component A can, for example, contain a polyamide molding composition or a polyolefin molding composition. Further suitable materials are molding compositions of thermoplastic polyesters or polyester elastomers. Molding compositions suitable as component B are, for example, those based on polyamide, polyolefins, thermoplastic polyesters, fluoropolymers or EVOH. Here, the polyamide used can advantageously be a grade based on m- or p-xylylidenediamine (e.g. PA MXD6).

Suitable polyamides include polyamides which are primarily aliphatic homopolyamides and copolyamides. Examples include 4.6, 6.6, 6.12, 8.10 and 10.10 polyamides or the like. Preference is given to 6, 10.12, 11.12 and 12.12 polyamides. [The naming of the polyamides corresponds to the international standard, with the first digit(s) indicating the number of carbon atoms of the starting diamine and the last digit(s) indicating the number of carbon atoms of the dicarboxylic acid. If only one number is given, this means that the starting material was an α,-aminocarboxylic acid or the lactam derived therefrom—H. Domininghaus, Die Kunststoffe und ihre Eigenschaften, p. 272, VDI-Verlag (1967).] If copolyamides are used these can contain, for example, adipic acid, sebacic acid, suberic acid, isophthalic acid or terephthalic acid as co-acid or bis(4-aminocyclohexyl)methane, trimethylhexamethylenediamine, hexamethylenediamine or the like as co-diamines.

The preparation of these polyamides is known (for example: D. B. Jacobs, J. Zimmermann, Polymerization Processes, pp. 424–467; Interscience Publishers, New York (1977); DE-B 21 52 194).

Still other suitable polyamides are mixed aliphatic/aromatic polycondensates, for example those described in U.S. Pat. Nos. 2,071,250, 2,071,251, 2,130,523, 2,130,948, 2,241,322, 2,312,966, 2,512,606, 3,393,210 or in Kirk-Othmer, Encyclopedia of Chemical Technology, 3rd edition, Vol. 18, Wiley & Sons (1982), pp. 328 and 435. Further polycondensates suitable as polyamides are poly(ether esteramides) or poly(etheramides), such as those products described in DE-A 27 12 987, 25 23 991 and 30 06 961.

The molecular weight (number average) of the polyamides is 4000 or above, preferably 10,000 or above. The relative viscosity ($\eta_{rel}$) is here preferably in the range of from 1.65 to 2.4. The polyamides noted can be used alone or in combination.

The polyamides can contain up to 40% by weight of other thermoplastics, as long as these do not impair the properties according to the present invention. Particular examples include polycarbonate [H. Schnell, Chemistry and Physics of Polycarbonates, Interscience Publishers, New York (1981)], acrylonitrile/styrene/butadiene copolymers [Houben-Weyl, Methoden der organischen Chemie, Vol. 14/1, Georg Thieme Verlag Stuttgart, pp. 393–406; Ullmanns Encyclopadie der technischen Chemie, 4th edition, Vol. 19, Verlag Chemie Weinheim (1981), pp. 279–284], acrylonitrile/styrene/acrylate copolymers [Ullmanns Encyclopadie der technischen Chemie, 4th edition, Vol. 19, Verlag Chemie Weinheim (1981), pp. 277–295], acrylonitrile/styrene copolymers [Ullmanns Encyclopädie der technischen Chemie, 4th edition, Vol. 19, Verlag Chemie Weinheim (1981), pp. 273 ff.] or polyphenylene ethers (DE-A 32 24 691 and 32 24 692, U.S. Pat. Nos. 3,306,874, 3,306,875 and 4,028,341).

If required, the polyamides can be impact modified. Examples of suitable modifiers include ethylene/propylene or ethylene/propylene/diene copolymers (EP-A-0 295 076), polypentenylene, polyoctenylene or random or block copolymers of alkenylaromatic compounds with aliphatic olefins or dienes (EP-A-0 261 748). Furthermore, it is also possible to use impact-modifying rubbers, such as core/shell rubbers having a viscoelastic core of (meth)acrylate, butadiene or styrene/butadiene rubber having glass transition temperatures $T_g < -10°$ C., with the core being able to be crosslinked. The shell can be made up of styrene and/or methyl methacrylate and/or further unsaturated monomers (DE-A 21 44 528, 37 28 685). The proportion of impact-modifying component should be selected such that the desired properties are not impaired.

Suitable polyolefins are homopolymers and copolymers of α-olefins having 2 to 12 carbon atoms, such as ethylene, propene, 1-butene, 1-hexene or 1-octene. Also suitable are copolymers and terpolymers which, in addition to these monomers, contain further monomers, in particular dienes such as ethylid enenorbornene, cyclopentadiene or butadiene.

Preferred polyolefins are polyethylene and polypropylene. In principle, any commercial grade of these polyolefins can be used. Examples of suitable polyolefins are linear polyethylene of high, intermediate or low density, LDPE, ethylene copolymers containing smaller amounts (up to a maximum of about 40% by weight) of comonomers such as n-butyl acrylate, methyl methacrylate, maleic anhydride, styrene, vinyl alcohol, acrylic acid, glycidyl methacrylate or the like, isotactic or atactic homopolypropylene, random copolymers of propene with ethene and/or 1-butene, ethylene-propylene block copolymers and the like. The polyolefins can also contain an impact modifier, such as EPM or EPDM rubber or SEBS. Furthermore, they can also contain, as previously described, functional monomers such as maleic anhydride, acrylic acid or vinyltrimethoxysilane in grafted form.

The thermoplastic polyesters have the following basic structure:

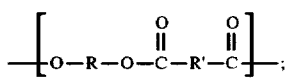

where R is a divalent branched or unbranched aliphatic and/or cycloaliphatic radical having from 2 to 12, preferably from 2 to 8, carbon atoms in the carbon chain, and R' is a divalent aromatic radical having from 6 to 20, preferably from 8 to 12, carbon atoms in the carbon skeleton. Examples of diols which can be used in the preparation of the polyesters are ethylene glycol, trimethylene glycol, tetramethylene glycol, hexamethylene glycol, neopentyl glycol, cyclohexanedimethanol or the like. Up to 25 mol % of the specified diol can be replaced by a diol having the following general formula

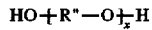

where R" is a divalent radical having from 2 to 4 carbon atoms and x can assume a value of 2 to 50. Preferable diols are ethylene glycol and tetramethylene glycol.

Suitable aromatic dicarboxylic acids which can be used in the preparation of the polyesters are, for example, terephthalic acid, isophthalic acid, naphthalene-1-4-, 1,5-, -2,6- or -2,7-dicarboxylic acid, diphenic acid, (diphenyl ether)-4,4'-dicarboxylic acid or their polyester-forming derivatives, for example dimethyl esters. Up to 20 mol % of these dicarboxylic acids can be replaced by aliphatic dicarboxylic acids, such as succinic acid, maleic acid, fumaric acid, sebacic acid, dodecanedioic acid, etc.

The thermoplastic polyesters have been prepared before (DE-A 24 07 155, 24 07 156; Ullmanns Encyclopädie der technischen Chemie, 4th edition, Vol. 19, page 65 ff. Verlag Chemie GmbH, Weinheim 1980). The polyesters used according to the present invention have a viscosity number (J value) in the range from 80 to 240 cm³/g. Preferred thermoplastic polyesters are polyethylene terephthalate and polybutylene terephthalate. If required, the polyesters can be impact-modified.

Suitable fluoropolymers are, for example, ethylene-tetrafluoroethylene copolymers (ETFE; e.g., TEFZEL 200 from DuPont or HOSTAFLON ET 6235 from Hoechst), tetrafluoroethylene-hexafluoropropene-vinylidene fluoride terpolymers (THV; e.g. HOSTAFLON TFB from Hoechst), ethylene-chlorotrifluoroethylene copolymers (ECTFE; e.g. HALAR from Ausimont) or polyvinylidene fluoride (PVDF). These polymers can contain plasticizers, but the use of plasticizer-free fluoropolymers is preferred. ETFE, THV and ECTFE are described, for example, in H. Domininghaus, Die Kunststoffe und ihre Eigenschaften, 4th edition, chapter 2.1.7 (Fluor-Kunststoffe).

Both the preparation and the structure of polyvinylidene fluoride are likewise known (Hans R. Kricheldorf, Handbook of Polymer Synthesis, Part A, Marcel Dekker Inc. New York - Basle - Hong Kong, p. 191 ff.; Kunststoff-Handbuch, 1st edition, Volume XI, Carl Hanser Verlag Munich (1971), p. 403 ff.). According to the present invention, polymers based on polyvinylidene fluoride containing up to 40k by weight of other monomers may also be present. Examples which may be mentioned of such additional monomers include trifluoroethylene, ethylene, propene and hexafluoropropene. The polyvinylidene fluoride used according to the present invention generally has a melt flow index of <17 g/10 min, preferably from 2 to 13 g/10 min (DIN 53 735), measured at 230° C. and under a load of 5 kg.

When the layers are ordered A/B/A (and correspondingly also for A/B/A/B/A), the following material combinations can, for example, be used:

A=polyamide, in particular PA 6, PA 6.6, PA 11 or PA 12

B=PVDF modified as in the above-mentioned references, other fluoropolymer or polybutylene terephthalate, EVOH or a polyamide compatible with A, for example a grade based on m- or p-xylylidene-diamine and adipic acid.

When the layers are ordered A/B/C/B/A, the following material combinations are of particular interest:

1. A=polyamide, in particular PA 6, PA 6.6, PA 11 or PA 12

B=a coupling agent in accordance with the prior art

C=EVOH

2. A=polyamide, in particular PA 6, PA 6.6, PA 11 or PA 12

B=PVDF modified as in the above-mentioned references, other fluoropolymer or polybutylene terephthalate C=polyamide, in particular PA 6, PA 6.6, PA 11 or PA 12

3. A=polyamide, in particular PA 6, PA 6.6, PA 11 or PA 12

B=a coupling agent in accordance with the prior art

C=polyolefin, in particular polyethylene or polypropylene

Suitable coupling agents are described in the following documents

DE-A or -C 40 01 125,
40 06 870,
41 12 662,
41 12 668,
41 37 430,
41 37 431,
41 37 434,
42 07 125,
42 14 383,
42 15 608,
42 15 609,
42 40 658,
43 02 628,
43 10 884,
43 26 130,
43 36 289,
43 36 290,
43 36 291, the German Patent Applications P 44 10 148.1 and 195 07 025.9 which are not prior publications and WO-A-93/21466, WO-A-94/18 485, EP-A-0 198 728 and EP-A-0 558 373. Suitable coupling agents are anhydride-modified polyolefins, polyurethanes, blends of the base polymers of A and C or ethylene/acrylate copolymers.

The inner and outer layers are made conductive by compounding the base polymer with an electrically conductive additive. This can be carried out by all methods of the prior art. Conductive additives which can be used are, for example, conductivity black, metal flakes, metal powder, metallized glass spheres, metallized glass fibers, metal fibers (for example of stainless steel), metallized whiskers, carbon fibers (which can also be metallized), intrinsically conductive polymers or, particularly advantageously, graphite fibrils. Other conductivity additives include conductive metal oxide powders, carbon powder, powders of other conductive metal compounds, such as carbides, nitrides and borides. It is also possible to use mixtures of various conductive additives.

Graphite fibrils are described in Plastics World, November 1993, page 10 f. These are tiny fibers of crystalline graphite. In the case of the material currently available commercially their average diameter is on the order of 0.01 microns, with an L/D ratio in the order of from 500:1 to 1000:1. Also basically suitable for the purposes of the present invention are graphite fibrils as described in the WO Applications Nos. 8603455, 8707559, 8907163, 9007023 and 9014221, and also in JP-A-03287821. The content of graphite fibrils in the molding composition is generally from 1 to 30% by weight, preferably from 1.5 to 10% by weight and particularly preferably from 2 to 7% by weight. When using the other electrically conductive additives similar amounts can be used. For instance, preferred ranges are for conductivity black from 4 to 25% by weight, for metal fibers from 5 to 15% by weight and for carbon fibers from 7 to 20% by weight. It is further preferred that a resistance of $10^9 \Omega$ and preferably of $10^7 \Omega$) between any place on the surface of the filter housing and the ground (i. e. the car body) is not exceeded.

The thickness of the inner and outer layers is selected so that, on the one hand, an electric potential formed can reliably be conducted away but, on the other hand, as little material as possible is required for cost reasons.

Preferred thicknesses in the case of A/B/A are

A 3 to 49.5% of the total wall thickness and

B 1 to 96% of the total wall thickness.

The fuel filter of the present invention is used, in particular, in the motor vehicle sector. Examples of fuels which can be filtered are gasoline and diesel fuel, with or without additive such as ethanol, methanol, and oxygenating additives.

Obviously, numerous modifications and variations of the present invention are possible in light of the above teachings. It is therefore to be understood that within the scope of the appended claims, the invention may be practiced otherwise than as specifically described herein.

German patent application 195 19 481.0 filed in Germany on May 27, 1995, is hereby incorporated by reference.

What is claimed as new and desired to be secured by letters Patent of the United States is:

1. A multilayer plastic fuel filter comprising filtering means for filtering fuel, a fuel inlet means a fuel outlet means, and a housing surrounding said filtering means and including said inlet means and said outlet means, the housing comprising:

(a) a conductive inner layer and a conductive outer layer, both comprising a first plastic;

(b) a non-conductive first middle layer, between said inner layer and said outer layer, comprising a second plastic; wherein said inner layer and said outer layer together form a continuous conductive path.

2. The multilayer plastic fuel filter of claim 1, wherein said first plastic and said second plastic comprise the same base polymer.

3. The multilayer plastic fuel filter of claim 1, wherein said first plastic and said second plastic comprise different base polymers.

4. The multilayer plastic fuel filter of claim 1, further comprising:

(c) a non-conductive second middle layer, between said inner layer and said outer layer, comprising said second plastic; and (d) a conductive third middle layer, between said first middle layer and said second middle layer, comprising said first plastic.

5. The multilayer plastic fuel filter of claim 4, wherein said first plastic comprises a polyamide selected from the group consisting of PA 6, PA 6.6, PA 11 and PA 12; and said second plastic comprises a member selected from the group consisting of PVDF, a fluoropolymer other than PVDF, polybutylene terephthalate, EVOH, a polyamide based on m-xylylidenediamine, a polyamide based on p-xylylidenediamine and a polyamide based on adipic acid.

6. The multilayer plastic fuel filter of claim 1, further comprising:

a second non-conductive middle layer, between said inner layer and said outer layer, comprising said second plastic; and (c) a third middle layer, between first middle layer and said second middle layer, comprising a third plastic.

7. The multilayer plastic fuel filter of claim 6, wherein said first plastic comprises a polyamide selected from the group consisting of PA 6, PA 6.6, PA 11 and PA 12;

said second plastic comprises a member selected from the group consisting of PVDF, a fluoropolymer other than PVDF, polybutyleneterephthalate and a coupling agent; and said third plastic comprises a member selected from the group consisting of polyamide 6, polyamide 6.6, polyamide 11, polyamide 12, EVOH, polyethylene and polypropylene.

8. The multilayer plastic fuel filter of claim 1, wherein said first plastic comprises a member selected from the group consisting of graphite fibrils, conductivity black, carbon fibers, metal fibers and an intrinsically conductive polymer.

9. The multilayer plastic fuel filter of claim 1, wherein said second plastic can act as a barrier to a fuel or an individual fuel component.

10. The multilayer plastic fuel filter of claim 1, wherein said second plastic can act as a barrier to methanol or ethanol.

11. The multilayer plastic fuel filter of claim 1, wherein said first plastic comprises a member selected from the group consisting of a polyamide, a polyolefin and a polyester.

12. The multilayer plastic fuel filter of claim 1, wherein said second plastic comprises a member selected from the group consisting of a polyamide, a polyolefin, a thermoplastic polyester, a fluoropolymer and EVOH.

13. The multilayer plastic fuel filter of claim 1, wherein said first plastic comprises a polyamide selected from the group consisting of PA 6, PA 6.6, PA 11 and PA 12; and said second plastic comprises a member selected from the group consisting of PVDF, a fluoropolymer other than PVDF, polybutylene terephthalate, EVOH, a polyamide based on m-xylylidenediamine, a polyamide based on p-xylylidenediamine and a polyamide based on adipic acid.

14. The multilayer plastic fuel filter of claim 1, wherein said first plastic comprises 1.5 to 10% by weight of graphite fibrils, and a polyamide selected from the group consisting of PA 6, PA 6.6, PA 11 and PA 12.

15. A method of making the multilayer plastic fuel filter of claim 1, comprising:

injection molding said first plastic, followed by injection molding said second plastic.

16. A method of filtering fuel, comprising:

providing fuel filter including a filtering means for filtering fuel, a fuel inlet means, a fuel outlet means, and a housing surrounding said filtering means and including said inlet means and said outlet means.

filtering a fuel through a fuel filter, wherein the housing of said fuel filter comprises:

(a) a conductive inner layer and conductive outer layer, both comprising a first plastic;

(b) a non-conductive first middle layer, between said inner layer and said outer layer, comprising a second plastic;

wherein said inner layer and said outer layer together form a continuous conductive path.

17. The method of claim 16, wherein said fuel is a motor vehicle fuel.

18. The method of claim 16, wherein said fuel is a motor vehicle fuel comprising ethanol or methanol.

* * * * *